United States Patent [19]

Speer

[11] Patent Number: 4,943,137
[45] Date of Patent: Jul. 24, 1990

[54] MULTI-CHANNEL, OFF-AXIS, BI-DIRECTIONAL FIBER OPTIC SLIPRING

[75] Inventor: J. Alexander Speer, Raleigh, N.C.

[73] Assignee: KDI Electro-Tec Corporation, Blacksburg, Va.

[21] Appl. No.: 252,106

[22] Filed: Oct. 3, 1988

Related U.S. Application Data

[63] Continuation-in-part of Ser. No. 7198, Jan. 27, 1987, abandoned.

[51] Int. Cl.⁵ .............................................. G02B 6/32
[52] U.S. Cl. ............................ 350/96.18; 250/227.11; 350/96.20; 350/96.25
[58] Field of Search ............... 350/96.10, 96.15, 96.16, 350/96.18, 96.19, 96.20, 96.21, 96.22, 96.24, 96.25, 96.27, 96.29, 96.30, 574, 413, 416; 250/227

[56] References Cited

U.S. PATENT DOCUMENTS

| | | | |
|---|---|---|---|
| 4,027,945 | 6/1977 | Iverson | 350/96.22 |
| 4,109,997 | 8/1978 | Iverson | 350/96.10 X |
| 4,109,998 | 8/1978 | Iverson | 350/574 |
| 4,258,897 | 3/1981 | Scott et al. | 350/96.20 |
| 4,398,791 | 8/1983 | Dorsey | 350/96.18 |
| 4,447,114 | 5/1984 | Koene | 350/96.20 |
| 4,460,242 | 7/1984 | Birch et al. | 350/96.20 |
| 4,519,670 | 5/1985 | Spinner et al. | 350/96.15 |

FOREIGN PATENT DOCUMENTS 0111390  6/1984  European Pat. Off. ......... 350/96.15

OTHER PUBLICATIONS

Es'Kov et al., "Construction Principles of Fiber-Optic Compensators," *Soviet J. Opt. Technol.*, vol. 48, No. 12, Dec. 1981, pp. 709–711.

*Primary Examiner*—John D. Lee
*Attorney, Agent, or Firm*—Watson, Cole, Grindle & Watson

[57] ABSTRACT

An optical slipring includes a derotating, transmissive intermediate optical component with an array of lensed optical transmitters and receivers respectively mounted on the rotor and stator. The lensed transmitters receive light from optical fibers, or other light source, and expand the light into a collimated light beam for transmission across the rotor/stator gaps. The lensed receivers receive the expanded, collimated light beams and focus them onto a receiving fiber or photodetector. To make the slipring bi-directional, each lens functions as both a converging and diverging lens and thus as a receiver and transmitter. Collimated light beams minimize light loss caused by the inability to efficiently couple diverging light beams. The expanded light beams enable the illumination of many of the small diameter optical fibers on the entrance face of the intermediate optical component and thus minimize the effect of individual broken fibers, the presence of debris, separation distances, component tolerances, or backlash in the gearing. The derotating, intermediate optical component comprises an image conduit, image transporter, or coherent optical fiber bundle of close-packed monofibers or multifibers which is capable of efficiently collecting and transmitting the collimated light beams because of its small numerical aperture, close packing, low bend losses and crosstalk, and minimal signal and wavelength dispersion. The intermediate optical component maintains optical continuity between the lensed transmitters and receivers of each channel with rotation of the slipring because of the two-fold symmetry of the entrance and exit faces of the optical fibers necessary for derotation and moves at half the angular velocity of the slipring.

6 Claims, 4 Drawing Sheets

PRIOR ART

MULTI-CHANNEL, OFF-AXIS, BI-DIRECTIONAL FIBER OPTIC SLIPRING

This is a Continuation-in-Part application of application Ser. No. 007,198, Filed Jan. 27, 1987, and now abandoned.

BACKGROUND OF THE INVENTION

1. Field of the investigation

This invention is directed to the bi-directional, multi-channel transmission of light passively across a rotary interface, and more particularly to such transmission in optical sliprings using fiber optic technology.

The ever increasing replacement of electrical data transmission systems with optical data transmission systems necessitates the development of many optical components, functionally equivalent to their electrical counterparts. For example, an electrical slipring is used to transmit electrical signals or power across a rotating interface. Optical rotary joints, such as optical sliprings, enable the transmission of optical signals across such a rotating interface. Presently successful low loss optical rotary joints are limited to single channel transmission devices wherein the optical system occupies the axis of rotation. Attempts have been made for multiple channel devices usually with high or variable light loss, mechanical complexity, large size, signal enhancement, or occupation of the axis of rotation. The present invention enables bi-directional, multi-channel, off-axis transmission across rotary interfaces with comparable light loss in either direction, with low light loss and low light signal variation with rotation, minimal wavelength dependence, and without occupation of the rotation axis of the rotary device to allow use thereof for other purposes.

2. Description of the Prior Art

Optical sliprings can be classified according to the number of transmission channels as either single channel or multi-channel fiber optic sliprings. Such sliprings can be further sub-classified by whether the optical system occupies the rotational axis of the slipring as in an on-axis system, or in an off-axis position; whether the light can travel uni-directionally or bi-directionally with nearly equal efficacy; and whether the slipring can successfully allow light to couple passively, or if the light signals are enhanced electronically, in an active system.

Single channel rotary interfaces have rotary connectors wherein the terminations of two optical fibers confront each other across the rotary interface in the rotation axis of the rotary joint. Light transmission is bi-directional and the optical terminations can either be the bare fiber ends as disclosed in U.S. Pat. Nos. 3,922,063, 4,124,272, 4,373,779, or 4,398,791; or lenses to better focus the light and reduce light loss as disclosed in U.S. Pat. No. 4,373,779 and by the May, 1984 publication of Althouse et al. in The Society of Photo-Optical Instrumentation Engineers - The International Society for Optical Engineering; volume 479, pages 117–120; "A low-loss bi-directional optical rotary joint for fiber-optic applications in fiber optic couplers, connectors, and splice technology".

Yet another variation of an on-axis optical slipring is described in U.S. Pat. No. 4,401,360 wherein two optical receivers are mounted on the rotor and stator axis of rotation, and two optical transmitters are mounted off-centered, but aimed at each of the two receivers. Because the motion of the slipring does not change the orientation of the devices, two optical channels are provided.

Because their geometry lends itself to low light loss, all on-axis optical sliprings can be constructed as passive as well as active optical transmission devices.

Multi-channel optical sliprings are required because of the need for more than one channel enabling transmission of more data with or without wavelength multiplexing, and the option of replacing the complexity and expense of wavelength multiplexing by merely increasing the number of channels. Additionally, multiple channels meet the demand for redundancy lacking in the single channel devices. Moreover, conventional electrical sliprings are often composite devices with the rotational axis occupied by a microwave, hydraulic or pneumatic rotary joint. However, the geometry of a multi-channel optical slipring is often off-axis and permits use of the rotational axis for other purposes. Several different multiple and off-axis optical sliprings have been proposed, which have varied construction and can be grouped according to their basic optical design as:

1. concentric fiber-bundles
2. waveguides
3. derotating, reflective or transmissive intermediate optical components
4. coaxial, reflective or transmissive intermediate optical components.

A related group are electronic sliprings, which are completely active light devices without optical components, for example as disclosed by Grimes et al. in Instrumentation in the Aerospace Industry - Volume 23 and Advances in Test Measurement - Volume 14, Instrument Society of America, pages 11–19 and entitled "Fiber optic slip rings for rotating test fixture acquisition" (1977).

The simplest, off-axis slipring comprises two opposed annular fiber bundles and increasing the number of such concentric annular bundles radially would make the device multi-channeled. Such devices have been described in U.S. Pat. Nos. 3,922,063, 4,109,997, 4,109,998, 4,124,272, 4,436,367 and 4,492,427 and the publication of Stecyk in "Fiber Optics Data Transmission for an IMU" (1977) in the Final Report for Contract Number IR&D Project No. 94, Report C-4896; The Charles Stark Draper Laboratory, Inc., Cambridge, Mass. The concentric, annular fiber bundle fiber optic sliprings are bi-directional but do have a modulated light loss dependent on the rotational angle, a phenomena described as "eclipsing". The light loss for such geometric slipring construction varies between 4 and 2.5 dB, or a 38% modulation as a percentage of the maximum loss. Increasing the number of fibers in a concentric ring can reduce the modulation as indicated by the publication of Stecyk. It is feasible to terminate the fibers with lenses, and perhaps an array of lenses, to improve light transmission and reduce modulation. Another technique of minimizing the importance of the modulation is to use a digitized signal rather than an analog signal.

A fiber bundle slipring using semicircular, radial fiber arrays is suggested in the aforementioned publication of Grimes et al. and can be made a multi-channel device by stacking along the slipring's rotational axis.

Devices primarily intended for applications other than sliprings, but still requiring a rotary optical coupler, have been described that contain annular fiber bundles in U.S. Pat. Nos. 3,401,232 and 3,411,011.

Waveguide optical sliprings have the common feature of spreading light over 360 degrees of the slipring by illuminating a waveguide. The signal is received by the other rotating member with detectors looking at the waveguide. U.S. Pat. Nos. 4,027,945, 4,109,997, 4,109,998, 4,456,903, 4,466,695, 4,519,673 and 4,525,025 have proposed optical sliprings wherein the circular waveguide is an open, reflective channel. These types of channel waveguide sliprings can be off-axis and capable of having multiple channels by being stacked; however, each channel is essentially uni-directional.

U.S. Pat. Nos. 4,165,913, 4,259,584, 4,277,134, 4,436,367 and Federal Republic of Germany Offenlegunsschrift No. 27 32 806 describe sliprings using solid waveguides which can be transparent rods, tubes, or optical fibers. The light leaks from the solid waveguide into a passive or active receiver because of the bending losses and roughening, splitting, or cutting of the transmitting waveguide or fiber cladding. Light leakage can be assisted by a contacting light-transmitting element such as a roller, slider, or bead of non-wetting liquid. These waveguide sliprings can be off-axis and capable of having multiple channels by being stacked but each channel is generally uni-directional.

One modification would be a transparent ring, and the possible method of building an optical slipring was published by the aforementioned publication of Grimes et al. 1977, who suggested that the fibers of a bundle be radially attached to a plexiglass ring forming one rotating member and that light detectors be used on the other member. Functionally comparable devices have been patented as in U.S. Pat. Nos. 4,107,517, 4,278,323, 4,456,903 and 4,436,367. These light-ring waveguide sliprings are described as both active and passive, off-axis sliprings capable of having multiple channels with possibly bi-directional data transmission. Commercial use of these light-ring fiber optic sliprings is described by Harmer in the 1984 publication in Fibre Optics '84; The Society of Photo-Optical Engineers - The International Society for Optical Engineering; Volume 468, pages 174–185 and having application for optical data links in automobile steering columns. The devices disclosed in U.S. Pat. Nos. 4,107,517, 4,456,903 and 4,436,367 need not employ a continuous 360 degree waveguide; partial light-rings, just large enough to maintain continuity to equally spaced detectors, can be used.

The most efficient optical sliprings are those that rely on an intermediate optical component which moves at half the angular velocity of the slipring with the help of a gear mechanism. The intermediate optical component can be either a reflective or transmissive device and is used to maintain optical continuity of the optical channels. The first described slipring of this type was disclosed in U.S. Pat. Nos. 4,109,997 and 4,109,998 which describe derotating intermediate optical component optical sliprings which used a Dove, Pechan, or other derotating prism as the intermediate optical component.

Devices containing a rotary optical coupler but intended for applications other than sliprings have been described with derotating prisms in U.S. Pat. Nos. 3,350,156, 3,428,812 and 3,997,793. U.S. Pat. No. 4,447,114 describes several disadvantages with sliprings using derotating prisms. Because the devices depend on the refraction of light entering the prisms, the sliprings would be wavelength dependent and thus could be built to operate only at one wavelength of light. Because of the long ray paths in the sliprings, divergence of the light becomes an important factor, especially for the Pechan prism. The lens arrays of these sliprings would also have to be aligned accurately and each lens separated at some distance from its neighbor to prevent light straying from one channel to another, resulting in crosstalk. To overcome these limitations, there is disclosed in U.S. Pat. No. 4,447,114 a derotating optical slipring wherein the intermediate optical component is a glass sphere bisected by a thin mirror. The intermediate optical component is located on the rotation axis and can have shapes other than a sphere. This patent also suggests a mirror at the junction of the bases of two cones in one configuration. The optical element can also be placed off center, but such a geometry produces a complex mechanical design with two, perpendicular axes of rotation.

Both U.S. Pat. Nos. 4,447,114 and 4,460,242 disclose derotating optical sliprings that use a transmissive intermediate optical component comprising an annular or circular array of optical fibers. A continuous optical channel is maintained by an unspecified arrangement of the fibers within the intermediate optical component. U.S. Pat. No. 4,258,976 describes a derotating optical slipring which uses a derotation plate as the intermediate optical component. The derotation plate is a packed array of optical fibers inverted through the center of the plate in their passage from the entrance face to the exit face of the plate. These derotating intermediate optical component optical sliprings can have multiple, bi-directional channels and can be either active or passive.

Multi-channel optical sliprings achieved with lenses or mirrors arranged coaxially to the axis of rotation have been described by U.S. Pat. No. 4,519,670 and by Harstead et al. (1986) in the Summaries of Technical Papers presented at the Optical Fiber Communication Conference, Feb. 24–26, 1986 sponsored by the Institute of Electronic Engineers & the Optical Society of America, pages 70–72 in a paper entitled "Low-loss multifiber optical rotary joint". Generally the optical path of a channel from one rotating member to another is maintained by the use of an intermediate lens, mirror or combination of lenses and mirrors which maintain the same relative position with respect to the rotation axis of the slipring during rotation. As in the case of the derotating intermediate optical component optical sliprings, this is accomplished by gearing; however, in the case of the coaxial optical sliprings the various optical components must rotate synchronously to maintain the optical paths.

The technical challenge in building a multi-channel, off-axis optical slipring is having the incoming light available for transmission over a 360 degree rotation, transmitting the light across the gap with minimum loss, dispersion, and modulation, then collecting sufficient light on the receiving side to conduct it along the fiber. A multiple channel optical slipring can be either an active or passive device, but the ideal slipring would be a passive device not having the limitations imposed by electronic components such as slower data rates or electromagnetic interferences.

Additionally, such an optical slipring would have an unoccupied rotational axis and would be bi-directional, transmitting the same, high percentage of light in both directions regardless of the rotational angle. Such an optical slipring should also efficiently transmit a range of light wavelengths simultaneously. The proposed optical slipring would not be size-dependent, allowing for any number of separate channels in any diameter.

The ideal optical slipring would also be immune from dirt, dust, and moisture. However, all of the prior art fiber optical sliprings have at least one or more of the aforementioned limitations, or lack one or more of the aforementioned advantageous features and attributes.

SUMMARY OF THE INVENTION

The invention relates to a derotating, transmissive intermediate optical component slipring with an array of optical transmitters and receivers on the rotor and stator of the slipring that overcomes the aforementioned disadvantages of known optical slipring devices and which obtains the features and advantages of the ideal optical slipring as discussed above.

The transmitters of the present invention are either geometric or graded refractive index (GRIN) lenses capable of receiving the light from an optical fiber or other light source and expanding it to a collimated light beam. The light receivers are also lenses capable of taking the expanded, collimated light beam and focusing it onto a receiving fiber or photodetector. Preferably, the slipring of the invention is designed to be bi-directional such that each lens mounted on either the rotor or stator functions as both a converging and diverging lens, and thus a receiver and transmitter.

Intermediate to the rotor and the stator is a transmissive intermediate optical component which moves at half the angular velocity of the slipring by the means of suitable gearing known per se to those skilled in the mechanical design of optical sliprings. The intermediate optical component of the present invention is capable of continuously receiving and transmitting light beams with rotation of the slipring rotor and stator and maintaining optical continuity between the transmitters and receivers located on the rotor and stator, because it has the necessary 2/m symmetry relating the entrance and exit faces necessary for derotation.

However, unlike the known optical sliprings, the intermediate optical component of the present invention comprises an image conduit or coherent fiber bundle of close-packed monofibers or multifibers which is capable of efficiently collecting and transmitting the collimated light beams produced by the lenses because of its small numerical aperture, close packing, low bend losses and crosstalk, and minimal signal and wavelength dispersion.

BRIEF DESCRIPTIONS OF THE DRAWINGS

The above objects, features and advantages of the invention are readily apparent from the following description of preferred embodiments of the best modes of carrying out the invention when taken in conjunction with the drawings, wherein.

DETAILED DESCRIPTION OF THE INVENTION

1. Operation of a derotating, transmissive optical component

With respect to FIGS. 1A–1D, transmitter 1T located on stator 2 emits light across fluid-filled (air or liquid) gap 5a by the light path 6a onto the entrance face of the intermediate optical component 3 labelled A–X. The light is conducted through the intermediate optical component 3 to the exit face labelled A'–X' where it can cross the second gap 5b, as light path 6b, to receiver 1R located on rotor 4. Stator marker 7, intermediate optical component marker 8, and rotor marker 9 indicate the relative motion between the stator and the rotor.

FIGS. 1A–1D show the principle of operation of a slipring with a derotating, transmissive intermediate optical component. At an initial position (0 degrees), light from the transmitter 1T located on stator 2 shines across the fluid-filled gap 5a via light path 6a onto the entrance face of the intermediate optical component 3 at A. The light is conducted through the intermediate optical component 3 to the exit face A' where it can cross the gap 5b via light path 6b to receiver 1R located on rotor 4. Stator marker 7, intermediate optical component marker 8, and rotor marker 9 are aligned. As the rotor of the slipring rotates through an angle of 45 degrees (FIG. 1B), the light from transmitter 1T is emitted across gap 5a as a light ray path 6a on the entrance face at W and X of the intermediate optical component 3. The light is conducted through the intermediate optical component 3 to the exit face at W' and X' where it crosses gap 5b as light path 6b to receiver 1R located on rotor 4. As can be seen from the position of the markers, the rotor marker 9 has moved through an angle of 45 degrees relative to the stationary stator marker 7, whereas the intermediate optical component marker 8 has moved through an angle of 22.5 degrees.

Figure 1A:
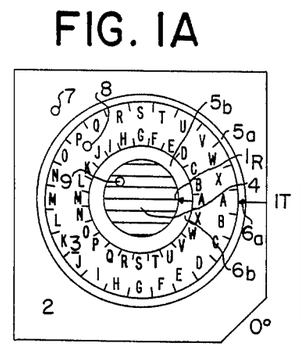
FIGS. 1A–1D illustrate the principle of operation of a derotating, transmissive intermediate optical component fiber optic slipring containing only a single optical channel at four rotation positions, respectively 0, 45, 90, 180 degrees, which principles are used in the present invention.
Figure 1B:
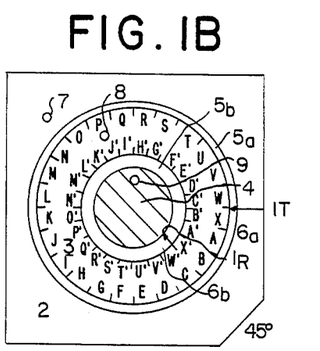
Figure 1C:
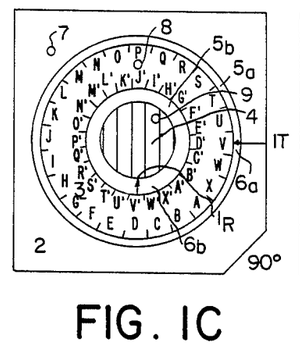
Figure 1D:
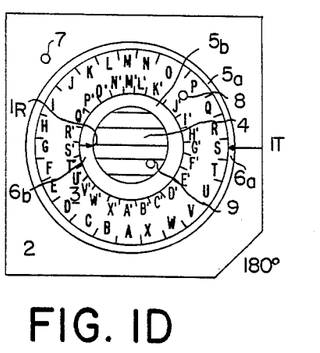

Further rotation of rotor 4 to 90 degrees causes light ray path 6a from transmitter 1T to impinge on the entrance face at V on intermediate optical component 3. The light is conducted through the intermediate optical component 3 to the exit face at V' where it crosses gap 5b to receiver 1R. While rotor marker 9 has rotated through an angle of 90 degrees with respect to stator marker 7, the intermediate component marker 8 has rotated through an angle of 45 degrees (FIG. 1C). With a rotation of 180 degrees (FIG. 1D) of the rotor, light ray 6a from transmitter 1T impinges on the entrance face at S of intermediate optical component 3. The light is conducted through the intermediate optical component 3 to the exit face at S' where it crosses gap 5b to receiver 1R located on the rotor. Rotor marker 9 indicates the 180 degree rotation with respect to stator marker 7, whereas intermediate optical component marker 8 records a 90 degree rotation.

From the preceding discussion, it is apparent that the operation of an optical slipring with a derotating transmissive intermediate optical component to any positive or negative angle of rotation can be described. While only one optical channel has been described, several channels are possible by placing an array of transmitters and receivers on the stator and rotor. In the embodiment described, transmitter 1T and receiver 1R are disclosed, however, the light transmission is bi-directional and thus the aforementioned components can function as receiver and transmitter, respectively. Transmitter 1T and receiver 1R can be optical fibers terminated with lenses in a passive slipring. In an active slipring, transmitter 1T could be a light source and/or receiver 1R a photodetector. Additionally, simultaneous transmission of many signals is possible over each single optical channel with the use of different wavelengths of light as the signal carriers and multiplexers and demultiplexers.

Figure 2:
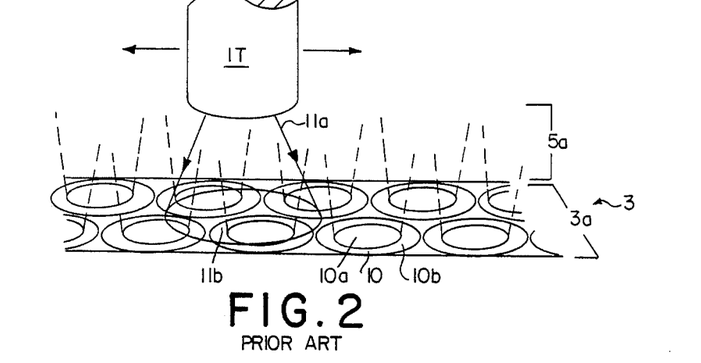
FIG. 2 schematically illustrates the operation of the entrance face of an intermediate optical component using a bare optical fiber as an optical transmitter and the intermediate optical component comprises a bundle of ordinary, large diameter fibers.

FIG. 2 shows the operation of the entrance face 3a of the intermediate optical component 3 wherein transmitter 1T is a bare optical fiber. Intermediate optical component 3 comprises optical fiber 10 with large diameter cores 10a and cladding 10b in a packed array with significant spaces between the fibers. Light travels and is received across the fluid-filled gap 5a in diverging transmitting acceptance cones 11a and receiving acceptance cones 11b.

To maintain a continuous light path in an optical channel of this slipring, intermediate optical component 3 must rotate at half the angular velocity of the rotor 4, assuming that stator 2 is a stationary reference point. This requirement is readily apparent from FIGS. 1A-1D by examining the relative positions of the stator marker 7, intermediate optical component marker 8, and rotor marker 9. This relative motion of the stator 2, intermediate optical component 3, and rotor 4 can be achieved by use of gears which are well known to those skilled in the art of slipring gear technology.

The second requirement to maintain a continuous light path in an optical channel of this slipring is the peculiar arrangement of the entrance and exit faces of the intermediate optical component 3. The labeled entrance faces A-X and exit faces A'-X'0 of the intermediate optical component 3 in FIGS. 1A-1D show that the entrance face in one quadrant of the intermediate optical component 3 must have an exit face in the adjacent quadrant. Furthermore, the entrance and exit face must be related by a certain symmetry, and the number and spacing of the entrance and exit faces in the intermediate optical component 3 must be such that a continuous path is maintained. The symmetry description depends on the actual geometry of the intermediate optical component 3 and two configurations, a cylinder and a platter, are described as illustrative of the invention.

2. The invention

The sliprings described in the prior art cited above, which are based on derotating transmissive intermediate optical components, would have indifferent performance because of significant light loss and light modulation. Light emitted or coupled into each of the optical fiber ends in these devices must lie within a certain size acceptance cone. The size of this cone is determined by the optical fiber core size and numerical aperture. The numerical aperture (NA) of a fiber in air depends on the refractive index of the fiber core ($n_{core}$) and cladding ($n_{cladding}$) and is given by $$NA = (n^2_{core} - n^2_{cladding})^{1/2}.$$

The large diameter optical fibers made of conventional materials used in the intermediate optical component of the prior art and the use of bare optical fibers or unfocused light sources and detectors for the transmitter and receiver would have relatively large angle, transmitting acceptance cones 11a and receiving acceptance cones 11b as shown in FIG. 2. The divergence of the light from transmitter 1T in a transmitting acceptance cone 11a, such as from a bare optical fiber shown in FIG. 2, would allow light to enter more than one receiving acceptance cone 11b on entrance face 3a of intermediate optical component 3, but would result in high light losses because only a fraction of the light from the transmitting acceptance cone 11a would impinge within a receiving acceptance cone 11b of a large diameter optical fiber core 10a and enter at angles so that it would propagate along the length of the fiber used to construct the intermediate optical component. Light loss in the intermediate optical component of the prior art is a result not only of the large angles of the acceptance cones, but also a result of the inability to pack densely relatively large fibers (FIG. 2); any light that falls between fibers will not be transmitted and will be lost.

Additionally, because transmitting acceptance cones 11a and receiving acceptance cones 11b move relative to one another, modulation of the light signal with rotation of the slipring is expected. Furthermore, only the optical fiber core is designed to transmit light; the function of the cladding is to reflect the light back into the core. Much of the entrance face 3a of an intermediate optical component constructed of larger diameter fibers is occupied by the cladding 10b, which may transmit light. However, because of the lower refractive index of the cladding, it will transmit the light differently than the fiber core 10a thereby introducing signal and wavelength dispersion as well as crosstalk. This would reduce the maximum data rate of the device. These same conditions described for the entrance face 3a of the intermediate optical component would also apply to the exit face 3b of the intermediate optical component.

The performance of a transmissive intermediate optical component could be greatly improved by the alternative configuration of the present invention. The present invention has three features:

1. replacing the fiber bundle of large diameter fibers of the prior art intermediate optical component with an image conduit, image transporter, or coherent optical fiber bundle comprised of monofibers or multifibers, 2. using lenses on the terminations of transmitters and receivers which can produce or focus an expanded and collimated beam of light across the gap between the stator or rotor and the intermediate optical component to make best use of the optical properties of the image conduit, image transporter, or coherent optical fiber, and 3. describing the geometry of a cylindrical and platter intermediate optical component for derotation in three-dimensions.

Bundles of fibers fall into two categories according to Levi in Applied Optics, John Wiley & Sons, pages 209-229 (1980):

(1) when no attempt has been made to arrange the fibers in an ordered array on a macroscopic or microscopic scale. These are termed fiber optic light guides or illuminators. The term incoherent bundle is also used (Levi, 1980, page 209). These bundles are used to provide 'cold light' illumination in difficult to reach locations as described by Levi (1980, pages 223-225) and Kapany in Fiber Optics Principles and Applications, Academic Press, pages 176-177 (1967) and will transmit light from the entrance face to the exit face in no particular order.

(2) when fibers are arranged so as to occupy the same relative position on the entrance face as they do on the exit face. In this case, it is not only possible to transmit light but an image as well. Such special fiber bundles are termed image conduits (Kapany, 1967, pages 311-312) or image transporters for they are actual image carriers. These are also termed coherent bundles by Levi (1980, page 209). Best known uses of image conduits and coherent optical fiber bundles are fiberscopes in medical endoscopy, boroscopy, and inspection probes; but image conduits are also used for vacuum envelope faceplates, image inverters, and enlargers and reducers (Levi, 1980, pages 227-229).

Image conduits can be made of closely packed, precisely arranged single optical fibers to form a monofiberscope described on page 13-16 of the Handbook of Optics, Optical Society of America (1978) or a monofilament fiber bundle described by Levi (1980, page 213). An alternative approach is to construct the image conduit from multiple fibers or multifibers. Multiple fibers were originally mentioned by Kapany in Fiber Optics. VI. Image Quality and Optical Insulation, Journal of the Optical Society of America, page 786 (1959) but are described by Kapany (1967, page 133), Levi (1980, pages 213-214), and in the Handbook of Optics (1978, pages 13-16 to 13-17). Multifibers comprise many high refractive index fiber cores fused by a low refractive index matrix to form a single optical fiber. The high refractive index fiber cores are in precise alignment so that they occupy the same relative position on the entrance face as they do on the exit face. An image conduit constructed of multifibers is capable of transmitting an image, in a complex path, and with low light loss. The image carrying capability of an image conduit or coherent optical fiber bundle has additional advantages for the intermediate optical component. The ability to transmit an image results from the fiber small numerical apertures (NA), that is, the small numerical aperture causes the emitted light to emerge nearly parallel. Moreover, the large number of fibers in a dense packing will result in low light losses and cause the modulation by the intermediate optical component to become vanishingly small. A thin cladding on the fibers formed by the low refractive index matrix is sufficient to prevent crosstalk, yet is small enough to prevent signal and wavelength dispersion. Additionally, the multifibers can have an extramural-absorption cladding, a second cladding of opaque material, to absorb light outside the acceptance angle.

If the image conduit or coherent optical fiber bundle is rigid, made by heat fusion of fibers, it can be heated and bent in the necessary symmetry required of the intermediate optical components discussed below. If the image conduit or coherent optical fiber bundle is flexible, the fibers are secured only on the ends, and the entrance and exit faces of the intermediate optical component could be arranged in the necessary symmetry required of the intermediate optical component discussed below. However, bending of the fibers in the intermediate optical component must minimize the coupling of light among fibers to prevent crosstalk. Additionally, the image carrying capability of the fiber bundle is used in a special way by the invention because of the necessary symmetry required of the intermediate optical component discussed below. The symmetry relation of the entrance and exit faces is such that a space- and orientation-preserving transmission of an asymmetrical image may not always be possible. However, because the image being transmitted is a circular cross-section of a beam of light, an image possessing an infinite symmetry in itself, the lack of space- and orientation-preserving image transmission is not a hinderance and all of the advantages of an image conduit or coherent optical fiber bundle can be utilized.

Figure 3:
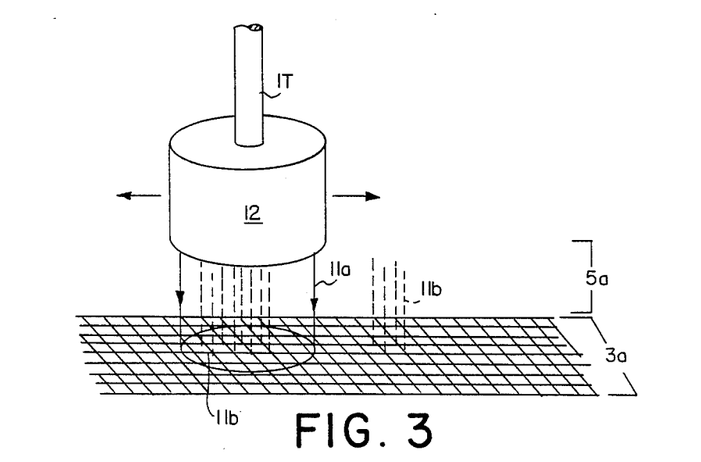
FIG. 3 is a schematic representation of the operation of the entrance face of the intermediate optical component where the transmitter is terminated with a lens for producing an expanded, collimated light beam and the intermediate optical component is an image conduit or coherent bundle comprised of monofibers or multifibers.

Terminating the transmitters and receivers with lenses would either collimate emitted light or focus the impinging light across the gap. As depicted in FIG. 3, lens 12 would receive the light from transmitter 1T and project an expanded, but collimated transmitting acceptance cone 11a across the fluid-filled gap 5a onto the entrance face of the intermediate optical component 3a, which, if it is an image conduit or coherent bundle as in FIG. 3, would efficiently receive the light in the small angle receiving acceptance cone 11b. This collimated light beam will eliminate light loss caused by the inability to inject all of the light in the cone-shaped beam emerging from bare exit face fibers into the receiving optical fibers of the intermediate optical component.

The additional advantage of using an expanded light beam across the gap is the ability to illuminate many of the small monofibers or multifibers on the entrance face of the intermediate optical component and thus minimize the effect of individual broken fibers, presence of debris, separation distances, tolerances, or backlash in the gearing. Once the light is transmitted through the intermediate optical component, light leaving the exit face of the intermediate optical component would emerge as an image of the incoming beam at the entrance face, i.e., as a collimated beam. This light beam would cross the gap and enter the converging lens of the receiver where the light would be focused into the receiver, either a photodetector in an active slipring or an optical fiber in a passive slipring.

Figure 4A:
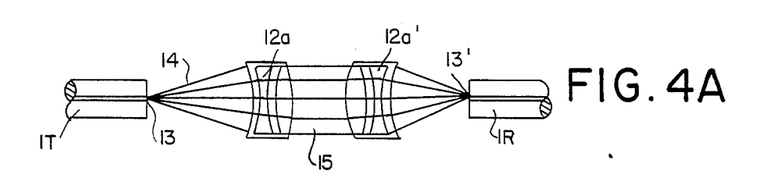
FIGS. 4A, 4B and 4C show the operation of the lenses on the transmitter and receiver of the slipring to collimate or focus the light across the gap of a slipring in three respective embodiments.
Figure 4B:
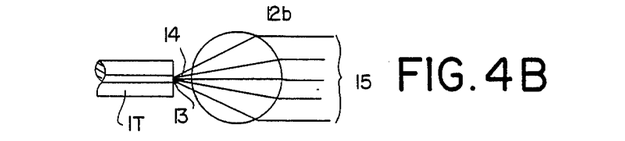
Figure 4C:
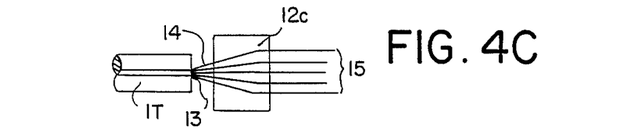

The lens to collimate or focus the light across the gap on the transmitter and receiver of the slipring could be of several types, preferred embodiments of which are shown in FIGS. 4A-4C. In FIG. 4A a multi-element lens 12a, as is well known in the art of optical lens design, could be used to receive the diverging light 14 from transmitter 1T placed at the focal point 13' of the lens and produce a collimated beam 15. A second multi-element lens 12a' could also receive the collimated beam 15 and inject light into receiver 1R if the receiver is placed at the focal point 13' of lens 12a'. More practical for the invention, where transmitter 1T is an optical fiber or small light source such as a light emitting diode, would be single-element lenses such as spherical lenses 12b shown in FIG. 4B, or uneven fractional pitch graded-refractive index lenses 12c shown in FIG. 4C. These lenses can also receive the diverging light 14 from transmitter 1T placed at the focal point 13' of the lens and produce a collimated beam 15.

Use of these lenses for coupling light between other fiber optic devices is well known and their use is disclosed in a 1981 publication entitled "Lens coupling in fiber-optic devices: efficiency limits"; by Nicia in Applied Optics, Volume 20, on pages 3136–3143. To minimize light loss the lenses may require corrections for lens aberrations, proper alignment, and antireflection coatings. Use of achromatic lenses would minimize wavelength dispersion and allow use of many light wavelengths in the slipring.

3. Fiber optical slipring with a cylindrical configuration

Figure 5:
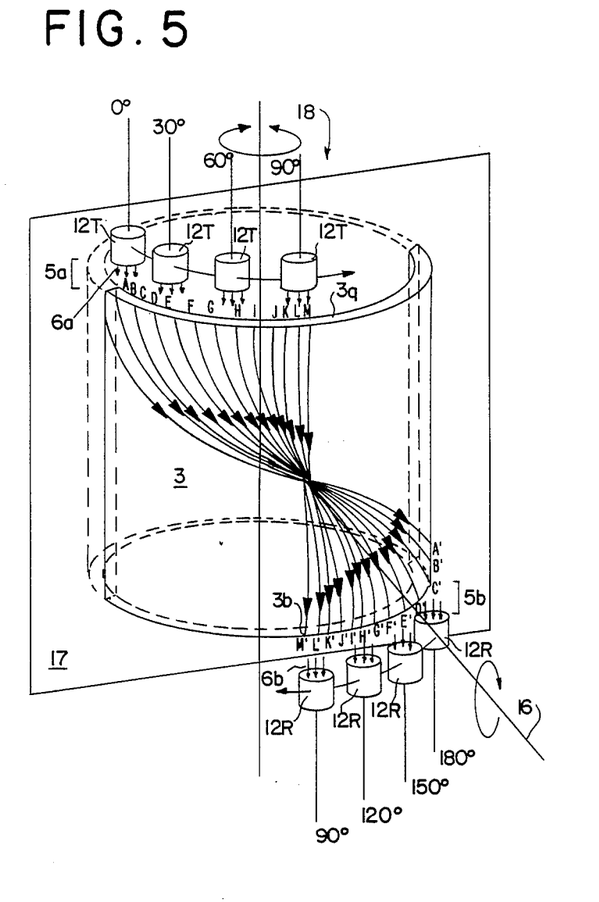
FIG. 5 shows a schematic representation of the structure and operation of a fiber optic slipring built with a cylindrical intermediate optical component, at four positions 30 degrees apart in accordance with the invention.

The operation of a fiber optic slipring at four positions 30 degrees apart in accordance with the invention with a cylindrical intermediate optical component 3a is shown in FIG. 5. Entrance face 3a and exit face 3b are located on the ends of the cylinder and the entrance and exit faces of individual monofibers or multifibers which comprise the annular image conduit or coherent optical fiber bundle are in adjacent quadrants of the cylinder. The entrance faces 3a for the fibers are labelled A-M and the exit faces 3b are labelled A'-M', and their arrangement for one quarter of the intermediate optical component is illustrated in FIG. 5. This necessary arrangement for the end faces of the individual fibers of one quarter of the image conduit or coherent bundle can be described by the two-fold (180 degree) rotation axis 16.

FIG. 5 shows the necessary arrangement for one quadrant of the intermediate optical component 3, the arrangement of the other three quadrants can be obtained by duplicating the first quarter. More specifically, the arrangement of the fibers in the second quarter on the front half of the intermediate optical component illustrated in FIG. 5 can be obtained by rotating the first quarter around an axis coincident with M-M' and making it conform to the curvature of the intermediate optical component. The arrangement of the remaining two quadrants of the intermediate optical component located away from the viewer in FIG. 5 can be obtained by reflection of the first two quarters on the front of the intermediate optical component across the mirror plane 17. The two-fold (180 degree) rotation axis 16, which can be designated by the shorthand notation 2, and the mirror plane 17, which can be designated by the shorthand notation m, are perpendicular, designated with a /, and their intersection coincides with the rotation axis of slipring 18. Both the axis of the cylindrical intermediate optical component and the rotation axis of slipring 18 must lie within the mirror plane 17. The resulting symmetry, which describes the arrangement of the individual fibers or their entrance and exit faces comprising the image conduit or coherent fiber bundle of a cylindrical intermediate optical component, is termed 2/m. The functional optical channels in the intermediate optical component have a symmetry which would be termed "2". The difference between the intermediate member 2 of Birch et al. and the image conduit of the intermediate optical component 3 of the present invention is understood from an examination of the symmetry of the devices shown in FIG. 1 of the reference and FIG. 5. The slipring in FIG. 1 of Birch et al. is a plane figure and symmetry elements used to describe the symmetry of the object must operate within that plane. The placement of the input and output faces of any fiber channel within the intermediate optical component 2 of Birch et al. is described firstly by a circular mirror which reflects the input/output faces to diametrically opposite inner and outer diameters of the intermediate optical component and secondly by a mirror plane located through the labels AA'C'C of the reference FIG. 1 which can be labelled $m_1$. These symmetry operations describe positions of the entrance and exit faces of one half of the intermediate optical component. The arrangement of the remaining half of the intermediate optical component can be obtained by reflection across a mirror plane located through the labels BD'B'D of the reference FIG. 1 which can be labelled $m_2$. The symmetry operation of these mirrors reflect objects back and forth within the plane of the figure. These two mirror planes give rise to an additional symmetry element at their intersection, a two-fold axis perpendicular to the plane which would be labelled "2". This two-fold rotation axis parallels the rotational axis of the slipring given by the large dark circle on FIG. 1 of the reference. The symmetry operation of the two-fold rotation moves objects within the plane by 180 degrees about the two-fold rotation axis. The symmetry describing placement of the entrance and exit faces of intermediate member 2 of Birch et al. is $p2m_1m$. This is a plane groups symbol where p indicates a primitive, two-dimensional plane group and the other symbols [2 and $m_1$ and $m_2$] describe the rotational axis and two mirrors at 90 degrees to one another. The functional optical channels in the intermediate optical component have a symmetry which would be termed m.

As disclosed here, the symmetry describing placement of the entrance and exit faces of any fiber channel in the intermediate optical component 3 of FIG. 5 is a two-fold rotation axis 16 perpendicular to the mirror plane 17 relating both halves of the intermediate optical component 3, a fact represented by '/' in the symbol 2/m. The rotation axis of the slipring 18 lies within the mirror plane 17 and at 90 degrees from the two-fold rotation axis 16, passing through the intersection of the mirror plane with the two-fold rotation axis. The symmetry describing placement of the entrance and exit faces of the image conduit of a three dimensional cylindrical intermediate optical component is the point group symbol 2/m2/m2/m. The functional optical channels in the intermediate optical component 3 have a symmetry which would be termed "2".

The operation of this embodiment of the invention can be understood from FIG. 5 if the cylindrical intermediate optical component 3 is considered to be the stationary reference and the stator and rotor move with respect to it, each moving at half the angular velocity of the slipring as a whole. At an initial 0 degree position of the lensed transmitter 12T, light emanates across the fluid-filled (air or liquid) gap 5a, following the light path 6a, onto the entrance face 3a of the cylindrical intermediate optical component at A-B. The light is transmitted through the intermediate optical component 3 to the exit face 3b at A'-B' where it crosses gap 5b, following light path 6b, to lensed receiver 12R located at a 180 degree position. As lensed transmitter 12T successively rotates through angles of 30 degree increments to 30, 60, and 90 degrees, it illuminates the entrance face 3a at D-F, G-I, and K-M successively on intermediate optical component 3. The light is transmitted through the intermediate optical component 3 to exit face 3b at D'-F', G'-I', and K'-M' successively where it crosses gap 5b, following light path 6b, to lensed receiver 12R located successively at the 150, 140, and 90 degree positions as shown in FIG. 5.

Figure 6:
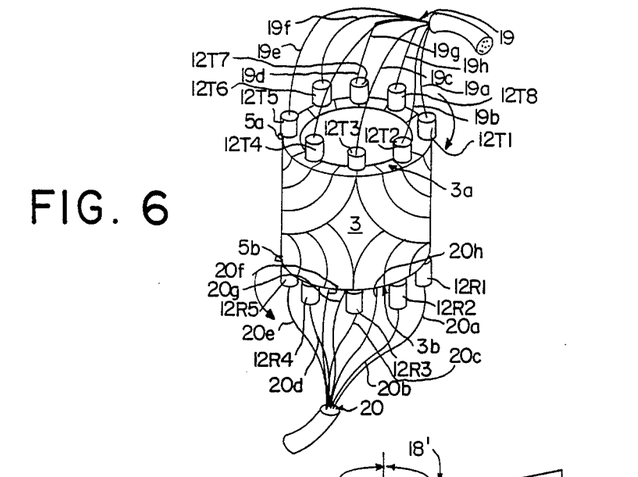
FIG. 6 shows a complete fiber optical slipring in accordance with the invention using a cylindrical derotating intermediate optical component.

FIG. 6 shows a complete optical system in accordance with an embodiment of the invention of a passive fiber optical slipring with a cylindrical, derotating intermediate optical component and eight separate optical channels. The image conduit or coherent optical fiber bundle of the intermediate optical component 3 is complete, comprising four of the quadrants described for FIG. 5. Differing light signals are conducted along each of the eight input optical fibers 19a-19h to lensed transmitters 12T1-12T8, which are equally spaced around a circumference corresponding to the median diameter of the image conduit or coherent optical fiber bundle. Lensed transmitters 12T expand the light of the optical fibers into a collimated beam which is projected across fluid-filled (air or liquid) gap 5a, onto entrance face 3a of the cylindrical intermediate optical component 3. The light from each of the eight optical channels can be conducted simultaneously through intermediate optical component 3 to exit face 3b where they are emitted as collimated light beams. The light beams cross the gap 5b to corresponding lensed receivers 12R1-12R8 (only 12R1-12R5 being shown in FIG 6 for the sake of clarity) which are also equally spaced around a circumference corresponding to the diameter of the coherent bundle. Lensed receivers 12R1-12R8 focus the light beams onto the entrance faces of the optical fibers and the differing light signals can be conducted along corresponding output optical fibers 20a-20h. As the slipring rotates, optical continuity of each of the eight optical channels is maintained because the intermediate optical component rotates at half the angular velocity of the rotor by means of gearing (not shown) and 2/m symmetry of the end faces of the image conduit or coherent optical fiber bundle comprising intermediate optical component[3]. While the light signal is described as traveling in one direction, light signals can travel in the opposite direction as well because the slipring is bi-directional. In an active slipring, input optical fibers 19 could be replaced with a light source, or the output optical fibers 20 could be replaced with a photodetector.

4. Fiber optical slipring with a platter configuration

Figure 7:
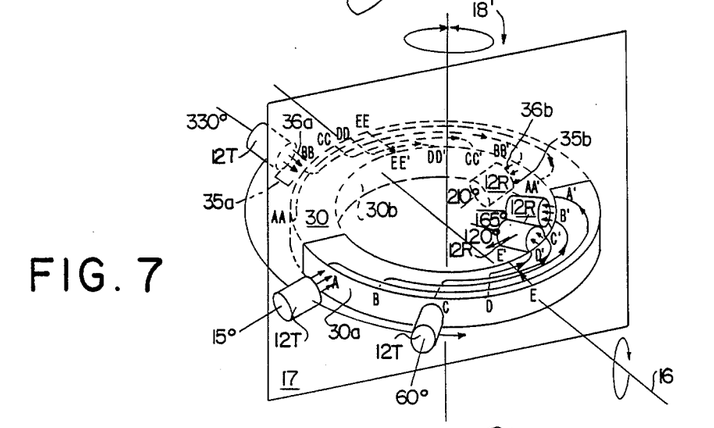
FIG. 7 shows the structure and operation of a fiber optic slipring with a platter intermediate optical component in accordance with a modified embodiment of the invention.

For a platter intermediate optical component, the entrance and exit faces are located on the diametrical surfaces of a ring. FIG. 7 illustrates an embodiment of an optical slipring with a platter intermediate optical component 30. Entrance face 30a is labelled A-E and exit face 30b is labelled A'-E'. Entrance face 30a for a second quadrant is labelled AA-EE and the exit face 30b is labelled AA'-EE'. Entrance face 30a for one quarter of the intermediate optical component must lie on the outside diametrical surface of one quadrant of the platter and the exit face 30b on the inside diametrical surface of an adjacent quadrant. The second quarter on the front half of the platter intermediate optical component illustrated in FIG. 7 can be obtained by rotating the first quarter around an axis coincident with E-E' or the two-fold (180 degree) rotation axis 16. The arrangement of the remaining two quadrants of the intermediate optical component located away from the viewer in FIG. 7 can be obtained by reflection across the mirror plane 17. The two-fold rotation axis 16 (=2) and mirror plane 17 (=m) are perpendicular (=/) and their intersection coincides with the rotation axis of slipring 18'. Both the axis of the platter intermediate optical component and the rotation axis of the slipring 18' must lie within mirror plane 17. The resulting symmetry, which describes the arrangement of the individual fibers or their entrance and exit faces of the image conduit or coherent fiber optical bundle for a platter intermediate optical component, is termed 2/m. The functional optical channels in the intermediate optical component have a symmetry which would be termed 2 followed by a symmetry operator which transposes the termination of the optical channel from the outside to the inside face of the platter, or vice-versa.

The operation of this embodiment of the invention can be understood from, FIG. 7 if the platter intermediate optical component 30 is understood to be the stationary reference and the stator and rotor move with respect to it, each moving at half the angular velocity of the slipring as a whole. At an initial 330 degree position of lensed transmitter 12T, light emanates across the fluid-filled (air or liquid) gap 35a, following light path 36a, onto entrance face 3a of the platter intermediate optical component 30 at BB. The light is conducted through the intermediate optical component 30 to the exit face 30b at BB' where it crosses gap 5b, following light path 36b, to lensed receiver 12R located at the 210 degree position. As lensed transmitter 12T successively rotates through to the 15 and 60 degree positions, it illuminates entrance face 3a at A and C successively on the outside of the platter intermediate optical component 30. The light is conducted through intermediate optical component 30 to exit face 30b at A' and C' successively where it crosses the gap 35b, following light path 36b, to lensed receiver 12R located successively at the 165 and 120 degree positions.

Figure 8:
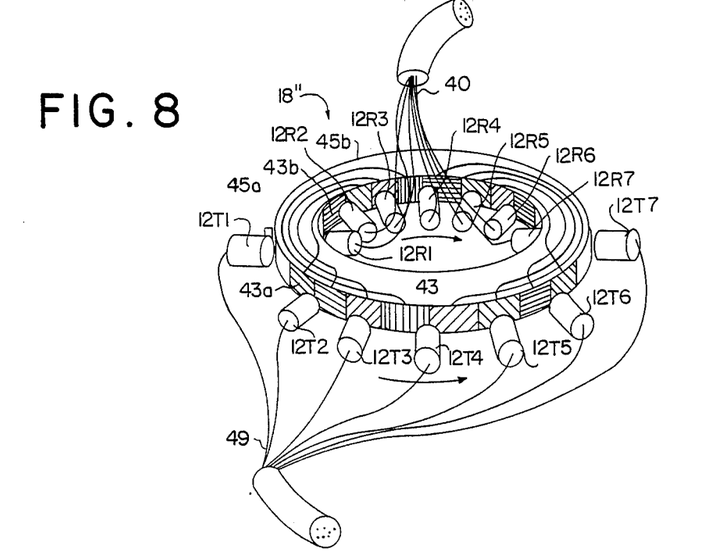
FIG. 8 shows a complete fiber optical slipring in accordance with a modified embodiment of the invention using a platter derotating intermediate optical component, with only seven channels occupying half the circumference of the slipring shown for clarity.

FIG. 8 illustrates the entire optical system of a passive fiber optical slipring 18 with a platter derotating intermediate optical component. Only seven optical channels, occupying half the circumference of the slipring, are shown for clarity. The image conduit or coherent optical fiber bundle of monofibers or multifibers of the intermediate optical component 43 is complete, comprising four of the quadrants described for FIG. 7. Differing light signals are conducted along each of the seven input optical fibers 49 to the lensed transmitters 12T1-12T7, which are equally spaced around the outside diameter of the platter. Lensed transmitters 12T1-12T7 expand the light of the optical fibers into collimated light beams which project across the fluid-filled (air or liquid) gap 45a, onto the entrance face 43a of the platter intermediate optical component 43. The light from each of the seven shown optical channels can be conducted simultaneously through the intermediate optical component 43 to the exit face 43b where they are emitted as collimated light beams. The light beams cross the gap 45b, to corresponding lensed receivers 12R1-12R7 which are also equally spaced around the inside diameter of the image conduit or coherent optical fiber bundle.

Lensed receivers 12R focus the light beams onto the entrance faces of the optical fibers and the differing light signals can be conducted along the corresponding output optical fibers 40. As the slipring rotates, optical continuity of each of the seven optical channels is maintained because the intermediate optical component rotates at half the angular velocity of the rotor by means of gearing (not shown, but known to those skilled in the mechanical design of sliprings) and the symmetry of the image conduit or coherent optical fiber bundle of the intermediate optical component.

While the light signal is described as traveling from the stator to the rotor, light signals can travel in the opposite direction, from the rotor to the stator, because the slipring is bi-directional. In an active slipring, the input optical fibers 49 could be replaced with a light source or the output optical fibers 40 could be replaced with a photodetector.

The above-described embodiments of preferred embodiments of the invention can be modified by those skilled in the optical slipring art and the invention is therefore not to be limited by the aforementioned description, but by the appended claims with due consideration for equivalents of the claimed components.

What is claimed is:

1. Fiber optic slipring with an intermediate optical component adapted to rotate at ½ the angular velocity of the slipring rotor, comprising:
   a rotor including a plurality of light transmitting elements mounted in spaced relationship in confronting relationship to an entrance face of said intermediate optical component;
   a stator including a corresponding plurality of light receiving elements mounted in corresponding spaced relationship in confronting relationship to an exit face of said intermediate optical component;
   said intermediate optical component comprising an image conduit, image transporter, or coherent optical fiber bundle of monofibers or multifibers for receiving light from each of said light transmitting elements across a gap between said entrance face and said light transmitting elements and transmitting light from said image conduit, image transporter, or coherent optical fiber bundle of monofibers or multifibers across a second gap between said exit face and said plurality of light receiving elements;
   a convergent/divergent lens mounted on each of said plurality of light transmitting and receiving elements to provide collimated light to a plurality of bi-directional channels formed by said image conduit, image transporter or coherent optical fiber bundle; and
   said image conduit, image transporter, or coherent optical fiber bundle of monofibers or multifibers having at least the entrance and exit faces of the fibers thereof related by a two-fold rotation axis substantially perpendicular to a mirror plane, which relates the entrance and exit face positions of each half of said intermediate optical component, extending through the rotation axis of the slipring and said two-fold rotation axis and said mirror plane also intersecting at the rotation axis of said slipring.

2. Fiber optic slipring with an intermediate optical component adapted to rotate at ½ the angular velocity of the slipring rotor, comprising:
   a rotor including a plurality of light transmitting elements mounted in spaced relationship in confronting relationship to an entrance face of said intermediate optical component;
   a stator including a corresponding plurality of light receiving elements mounted in corresponding spaced relationship in confronting relationship to an exit face of said intermediate optical component;
   said intermediate optical component comprising an image conduit, image transporter, or coherent optical fiber bundle of monofibers or multifibers for receiving light from each of said light transmitting elements across a gap between said entrance face and said light transmitting elements and transmitting light from said image conduit, image transporter, or coherent optical fiber bundle of monofibers or multifibers across a second gap between said exit face and said plurality of light receiving elements;
   a single-element spherical lens mounted on each of said plurality of light transmitting and receiving elements to provide collimated light to a plurality of bi-directional channels formed by said image conduit, image transporter or coherent optical fiber bundle; and
   said image conduit, image transporter, or coherent optical fiber bundle of monofibers or multifibers having at least the entrance and exit faces of the fibers thereof related by a two-fold rotation axis substantially perpendicular to a mirror plane, which relates the entrance and exit face positions of each half of said intermediate optical component, extending through the rotation axis of the slipring and said two-fold rotation axis and said mirror plane also intersecting at the rotation axis of said slipring.

3. Fiber optic slipring with an intermediate optical component adapted to rotate at ½ the angular velocity of the slipring rotor, comprising:
   a rotor including a plurality of light transmitting elements mounted in spaced relationship in confronting relationship to an entrance face of said intermediate optical component;
   a stator including a corresponding plurality of light receiving elements mounted in corresponding spaced relationship in confronting relationship to an exit face of said intermediate optical component;
   said intermediate optical component comprising an image conduit, image transporter, or coherent optical fiber bundle of monofibers or multifibers for receiving light from each of said light transmitting elements across a gap between said entrance face and said light transmitting elements and transmitting light from said image conduit, image transporter, or coherent optical fiber bundle of monofibers or multifibers across a second gap between said exit face and said plurality of light receiving elements;
   an uneven fractional pitch graded-refractive index lens mounted on each of said plurality of light transmitting and receiving elements to provide collimated light to a plurality of bi-directional channels formed by said image conduit, image transporter or coherent optical fiber bundle; and
   said image conduit, image transporter, or coherent optical fiber bundle of monofibers or multifibers having at least the entrance and exit faces of the fibers thereof related by a two-fold rotation axis substantially perpendicular to a mirror plane, which relates the entrance and exit face positions of each half of said intermediate optical component, extending through the rotation axis of the slipring and said two-fold rotation axis and said mirror plane also intersecting at the rotation axis of said slipring.

4. The slipring as claimed in claims 1, 2, or 3 wherein said light transmitting elements are spaced at predetermined spaced intervals along the circumference of said entrance face and said light receiving elements are spaced at substantially identically spaced intervals along the circumference of said exit face.

5. The slipring as claimed in claims 1, 2, or 3 wherein said intermediate optical component is formed as a cylinder and said entrance and exit faces are located respectively on opposite ends of said cylinder substantially perpendicular to the axis of rotation of said cylinder and substantially perpendicular to the axis of rotation of the slipring.

6. The slipring as claimed in claims 1, 2, or 3 wherein said intermediate optical component is a platter and said entrance and exit faces are located on diametrically opposite faces of said platter substantially parallel to the axis of rotation of said platter and substantially parallel to the axis of rotation of said slipring.

* * * * *